Oct. 30, 1928.  W. BEUSCH  1,689,992
ELECTRICITY METER
Filed Aug. 6, 1923
Fig.1
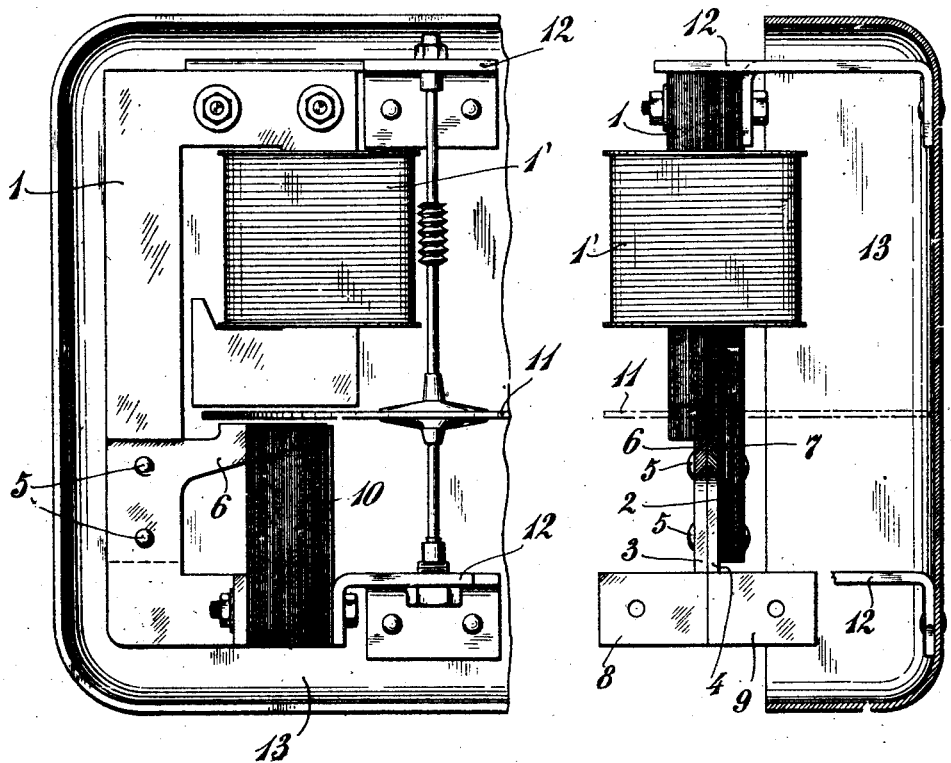
Fig.2
Fig.3
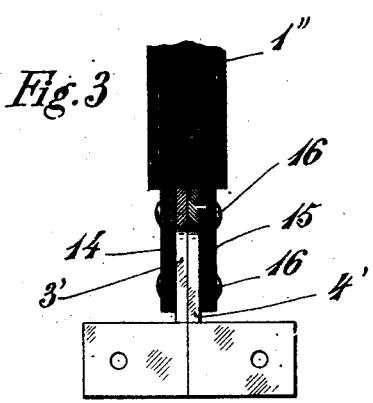
Inventor:
Willi Beusch
by P. Singer
Atty Patented Oct. 30, 1928.

1,689,992

UNITED STATES PATENT OFFICE.

WILLI BEUSCH, OF ZUG, SWITZERLAND, ASSIGNOR TO THE FIRM LANDIS & GYR A.-G., OF ZUG, SWITZERLAND.

ELECTRICITY METER.

Application filed August 6, 1923, Serial No. 656,041, and in Switzerland August 18, 1922.

The present invention relates to electricity meters of the Ferraris type and more particularly to the motor mechanism thereof having a main current magnet and a pressure magnet said pressure magnet being provided with a counterpole to close the circuit of the active magnetic flux of the pressure coil. It has been proposed to make the counterpole of sheet metal pieces passing through the core of the pressure magnet which are thicker than the laminations of the voltage core; it has been further proposed to have the core of the pressure magnet built up of laminations of the same thickness up to the joint with the main current magnet core, the counterpole being formed by projections on the said laminations of the pressure magnet core. If constructed as first described eddy currents are generated in the core of the pressure magnet and if constructed in the second manner fluxes occur in the core of the main current magnet which attain a strength detrimental to the good working of the meter. To obviate these drawbacks the counterpole according to the present invention is formed of lateral projections at the upper ends of brackets by which the cores of the pressure magnet and of the main current magnet are united.

In the accompanying drawings two preferred forms of the invention are shown by way of examples.

Fig. 1 shows part of a meter with the motor mechanism in front elevation,

Fig. 2 is a side view thereto some parts being in section,

Fig. 3 shows part of the modified core of the pressure magnet in a side view parts being in section.

In the drawings Figs. 1 and 2, 1 denotes the core of the pressure magnet, on which the coil 1' is arranged, consisting of a bundle of thin sheet metal laminations. At the lower end of the core some of said laminations 2 project over the others in downward direction. To the prolongations 2 the lugs 3, 4 of brackets 8, 9 are rigidly connected by means of rivets 5 interconnecting the lugs 3, 4 and the laminations. Said brackets consist of sheet metal and are considerably thicker than the laminations of the core 1. The upper ends of the lugs 3, 4 abutting on the laminations of the core 1 are provided with lateral arms 6, 7 which together form the counterpole. To the lower ends of the brackets 8, 9 the core 10 of the main current magnet is rigidly fixed by bolts. 11 denotes the meter disc which is rotatably mounted in the support 12 of the meter casing.

In the modified construction according to Fig. 3 the lugs 3', 4' of the bracket are arranged between two sets 14, 15 of prolongations of the laminations of the core of the pressure magnet. The sets 14, 15 are arranged symmetrically to the centre plane of the core. The lugs 3', 4' are rigidly united with the laminations by means of rivets 16. The upper ends of the lugs 3', 4' are provided with lateral arms 6, 7 forming the counterpoles.

What I wish to secure by Letters Patent of the United States is:—

1. In an induction meter in combination, a motor mechanism comprising a main current magnet and a pressure magnet having a laminated core, and a counterpole consisting of flat metal plates connected to the lower end of the core but not extending into its structure so as to affect the electromagnetic action of the core and coil.

2. In an induction meter in combination, a motor mechanism comprising a main current magnet and a pressure magnet having a laminated core, and a counterpole consisting of flat metal plates connected to the lower end of the core but not extending into its structure so as to affect the electromagnetic action of the core and coil and a laminated current magnet core supported by said plates.

3. In an induction meter in combination, a motor mechanism comprising a main current coil and core and a pressure coil and core, and a connecting and supporting member fastened to both said cores and having an integral portion thereof formed into a counterpole for the pressure magnet.

4. In an induction meter in combination, a meter disc and spindle, a current coil and core on one side of the disc, a pressure coil and core on the other side of the disc, the pressure core extending from one end of the coil past the coil, the two ends of the core constituting a shunt magnetic circuit near the disc, and a connecting and supporting member connected to both the current core and pressure core and having an extension constituting a counterpole for the pressure magnetic circuit.

In witness whereof I affix my signature.

WILLI BEUSCH.